United States Patent
Kawamura

(10) Patent No.: US 8,149,463 B2
(45) Date of Patent: Apr. 3, 2012

(54) INFORMATION PROCESSING APPARATUS, IMAGE PROCESSING APPARATUS AND METHOD THEREOF, WHICH CREATE AND USE A HALFTONE SCREEN

(75) Inventor: Naoto Kawamura, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 584 days.

(21) Appl. No.: 12/246,977

(22) Filed: Oct. 7, 2008

(65) Prior Publication Data

US 2009/0097073 A1 Apr. 16, 2009

(30) Foreign Application Priority Data

Oct. 16, 2007 (JP) .................. 2007-269529

(51) Int. Cl.
*G06K 15/00* (2006.01)
*H04N 1/405* (2006.01)
(52) U.S. Cl. .................. 358/3.06; 358/1.9; 358/3.3
(58) Field of Classification Search .......... None
See application file for complete search history.

(56) References Cited

U.S. PATENT DOCUMENTS

| 6,128,099 | A | 10/2000 | Delabastita |
| 7,471,421 | B2 | 12/2008 | Asai |
| 2004/0223189 | A1 | 11/2004 | Bhattacharjya |
| 2005/0094212 | A1 | 5/2005 | Asai |
| 2006/0077469 | A1* | 4/2006 | Asai et al. ............ 358/3.06 |

FOREIGN PATENT DOCUMENTS

| CN | 1758703 A | 4/2006 |
| EP | 1646222 A2 | 4/2006 |
| EP | 1906647 A2 | 4/2008 |
| JP | 2006-014271 A | 1/2006 |
| JP | 2006-109324 A | 4/2006 |

* cited by examiner

*Primary Examiner* — Twyler Haskins
*Assistant Examiner* — Christopher D Wait
(74) *Attorney, Agent, or Firm* — Canon USA Inc IP Division

(57) ABSTRACT

A halftone screen which is applicable to a low-resolution electrophotographic printer is created. Hence, dot-lattice points arranged in a predetermined region are displaced using rotation processing, the predetermined region is partitioned into polygons each of which surrounds the dot-lattice point. Then, a threshold matrix used to grow a halftone dot, which is surrounded by each polygon, in a direction of the displacement is generated.

14 Claims, 15 Drawing Sheets

F I G. 17
|    |    |    | 59 | 60 |    |    |    |
|----|----|----|----|----|----|----|----|
|    |    | 56 | 46 | 31 | 32 | 47 | 50 |
|    | 49 | 45 | 39 | 21 | 22 | 17 | 18 | 40 |
| 44 | 30 | 20 | 15 | 10 | 3  | 7  | 9  | 24 | 33 |
|    | 37 | 16 | 8  | 2  | 1  | 4  | 13 | 25 | 34 |
|    | 38 | 19 | 11 | 5  | 6  | 14 | 23 | 26 | 35 |
|    |    | 36 | 29 | 12 | 27 | 28 | 43 | 54 | 55 |
|    |    | 48 | 41 | 42 | 51 | 52 | 53 |
|    |    |    | 57 | 58 |    |    |    |
F I G. 18
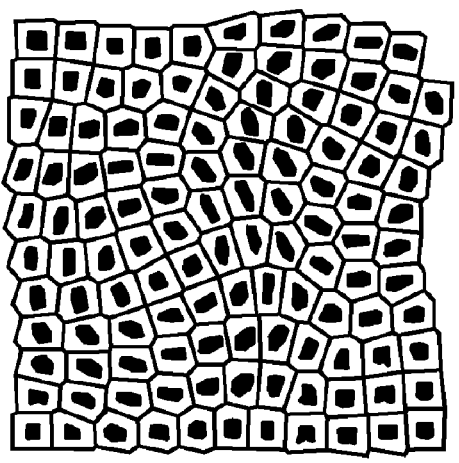

FIG. 22B

| 66  | 68  | 70  | 110 |     |     |     |
|-----|-----|-----|-----|-----|-----|-----|
| 100 | 80  | 48  | 50  | 52  | 108 |     |
| 94  | 36  | 18  | 26  | 46  | 86  | 106 |
| 120 | 64  | 34  | 14  | 8   | 28  | 56  | 104 |
| 118 | 62  | 44  | 6   | 2   | 12  | 54  | 102 |
| 92  | 42  | 20  | 4   | 10  | 24  | 84  | 116 |
| 112 | 78  | 30  | 16  | 22  | 58  | 82  | 114 |
| 90  | 40  | 32  | 38  | 72  | 96  |     |
| 98  | 60  | 74  | 76  |     |     |     |
|     | 88  |     |     |     |     |     |

FIG. 22A

| 65  | 67  | 69  | 109 |
| 99  | 79  | 47  | 49  | 51  | 107 |
| 93  | 35  | 17  | 25  | 45  | 85  | 105 |
| 119 | 63  | 33  | 13  | 7   | 27  | 55  | 103 |
| 117 | 61  | 43  | 5   | 1   | 11  | 53  | 101 |
| 91  | 41  | 19  | 3   | 9   | 23  | 83  | 115 |
| 111 | 77  | 29  | 15  | 21  | 57  | 81  | 113 |
| 89  | 39  | 31  | 37  | 71  | 95  |
| 97  | 59  | 73  | 75  |
| 87  |

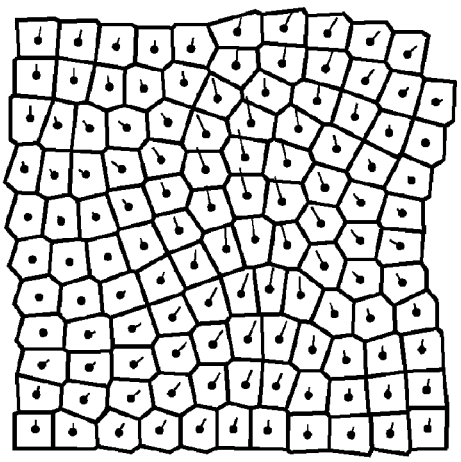
F I G. 26
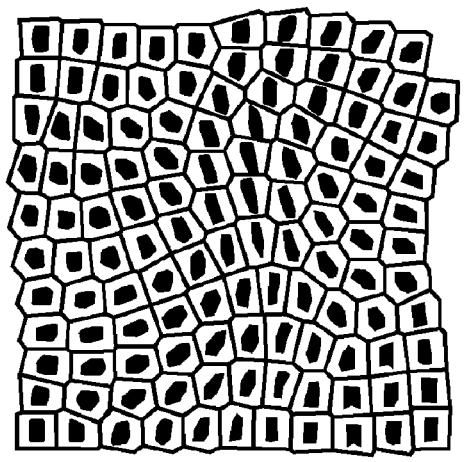
F I G. 27
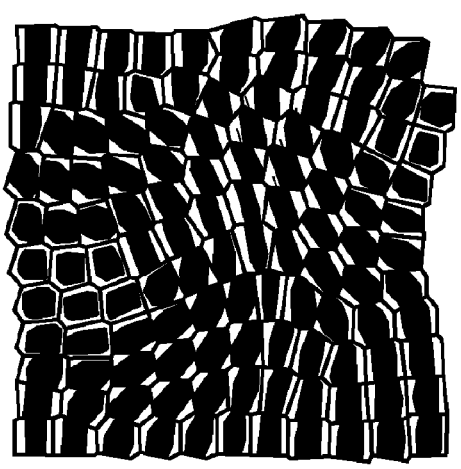
F I G. 28
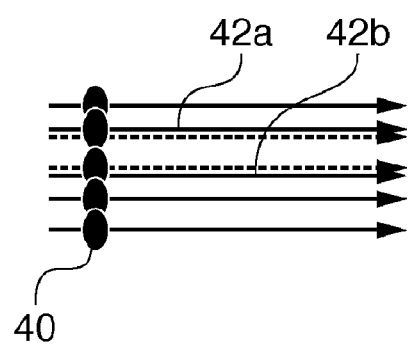
F I G. 29

INFORMATION PROCESSING APPARATUS, IMAGE PROCESSING APPARATUS AND METHOD THEREOF, WHICH CREATE AND USE A HALFTONE SCREEN

BACKGROUND OF THE INVENTION

1. Field of the Invention

The present invention relates to an information processing apparatus, image processing apparatus and method thereof, which create and use a halftone screen.

2. Description of the Related Art

An electrophotographic printing apparatus, which has an exposure process for removing charges from a uniformly charged surface layer of a photosensitive drum, which is made up of an organic photoconductor (OPC), amorphous silicon, or the like, by scanning a light beam, has a non-linear characteristic. Also, complexity of an electrophotography process including development, transfer, fixing, and the like also causes the non-linear characteristic.

With this non-linear characteristic, an interference occurs between print dots. For example, when one isolated dot is to be printed, it is difficult to record such a dot, but dots are reliably recorded in a cluster state of several dots. When a distance between dots is small, toner often moves to connect dots. In a process for recording dots by attaching ink droplets on a medium like in an ink-jet system, although a micro phenomenon between the ink and medium occurs, an interference between dots hardly occurs and dots can be surely recorded.

A print image by an electrophotographic printing apparatus is largely influenced by variations of a spatial frequency due to the non-linear characteristic of the electrophotography process. Upon forming a halftone image by the electrophotography process, a halftone dot method is used in consideration of the non-linear characteristic. When the halftone dot method is used, a fundamental spatial frequency is fixed, and dots can be stably recorded without being influenced by variations of the spatial frequency. For example, assuming that the screen ruling of halftone dots is N lines/inch, a pitch P of halftone dots is 25.4/N mm. That is, the spatial frequency is $1/(2P)=N/(2\times25.4)$, and the fundamental spatial frequency is fixed. Therefore, when a printing apparatus is designed to always stabilize the electrophotography process at the fundamental spatial frequency, a print image can be stably formed. For example, in a printing apparatus of 1200 dpi, the fundamental frequency of a halftone dot screen of 200 lines/inch is 4 cycles/mm. That is, by stabilizing the electrophotography process at the spatial frequency of 4 cycles/mm, the image reproduction characteristic of the printing apparatus can be improved.

An AM modulation method based on the halftone dot method can obtain a stable image reproduction characteristic. At the same time, moiré is readily generated since C, M, Y, and K color tones are superposed in color printing. In order to suppress moiré, screen angles are changed for respective color components to drive moiré beats generated among color components toward the high frequency side, thus visually obscuring moiré. For example, moiré due to superposition of color toners is suppressed by setting the Y screen angle to be 30°, and the C, M, and K screen angles to be 0° or 60°.

In digital halftone processing, since the resolution of a digital image is discrete, arbitrary screen angles cannot be set. However, if optimal and discrete screen angles are selected for respective color components, moiré can be suppressed.

However, even when the technique that changes the screen angles is introduced, moiré beats are merely driven to the high frequency side, and a unique pattern formed due to superposition of color components remains. This is a so-called Rosetta pattern, which disturbs upon outputting a high-image quality image. Particularly, upon outputting a photo image with high image quality, smooth image quality reproduction is demanded like a photo obtained by the silver halide process, and the Rosetta pattern becomes a serious disturbance.

As another approach, a method of attaining tone reproduction by an FM modulation method based on error diffusion or blue noise masking is available. The FM modulation method is popularly adopted in an ink-jet system, thermal transfer system, and the like, since it generates a random layout of print dots, has high tonality, and is free from any moiré due to superposition of color components. However, in the FM modulation method, the dot interval changes, and cannot be freely controlled. For example, as the density value becomes higher, the dot interval is gradually reduced. For this reason, the spatial frequency characteristic changes to the high frequency side, and is directly influenced by the frequency characteristic of a printing apparatus. Therefore, the FM modulation method is not suited to an electrophotographic printing apparatus, which is readily influenced by spatial frequency variations.

As a method of solving the aforementioned problems, a hybrid halftone method attracts attention. This method is an intermediate method of the AM and FM modulation methods, and has features of both the methods. The hybrid halftone method clusters dots to vary dot intervals. Since the dot interval variations are irregular and anisotropic, the spatial correlation among dots lowers, thus suppressing generation of moiré.

The hybrid halftone method deprives periodicity by clustering dots and moving lattice points (the central positions of halftone dots) using a random number and rotation manipulation, thereby suppressing generation of moiré. Various methods of generating a hybrid halftone screen have been proposed. These methods have an advantage (print stability) of the AM modulation method and those (moiré dissolution, high resolution) of the FM modulation method, and an image output with high screen ruling and high image quality is expected.

However, the hybrid halftone method targets a printer of a high resolution (e.g., 2400 dpi), and is premised on formation of one halftone dot at a high resolution. On the other hand, an office-use electrophotographic printer has a resolution as low as 600 dpi, and it is difficult to achieve both high halftone-dot screen ruling and a sufficient tone characteristic. Furthermore, heterogeneity in pitch of an engine that scans a light beam, banding noise due to mechanical vibrations, and the like cause considerable deterioration of image quality. Hence, in order to apply the hybrid halftone method to an office-use printer, special attention is needed.

Upon applying the hybrid halftone method to an electrophotographic printing apparatus, low and middle density ranges exhibit relatively good tone characteristics. However, in a high density range, halftone dots grow to reduce the areas of blank regions among halftone dots, and blank regions each having a width of one to two pixels are formed. For this reason, the blank regions become crushable and unstable owing to the temperature, mechanical vibrations, electrophotography process variations, and the like, and image quality considerably deteriorates due to the aforementioned heterogeneity in pitch and banding noise.

As a method of avoiding the blank regions from crushing, a method of introducing white dots is known. In the AM modulation method, black and white dots are laid out in a checkerboard pattern to blacken white dots from outside (to grow black dots) to have an intermediate density as a boundary. That is, black and white dots grow to be symmetrical about a density axis, so as to stabilize white dots. However, since white dots are laid out in a checkerboard pattern, the screen ruling of halftone dots is reduced to about $\sqrt{(1/2)} \approx 0.7$ compared to a case without introducing any white dots (all black dots).

When a printer of 600 dpi is used to form a halftone dot screen of 175 lines on average, about 12 pixels are used for a halftone dot that forms one threshold matrix using the threshold matrix of 3.4×3.4 pixels on average in a state without introducing any white dots. However, when white dots are introduced, a threshold matrix is defined by about 2.4×2.4 pixels, and only about six pixels are used for a halftone dot that forms one threshold matrix. That is, it becomes difficult to form a desired halftone dot screen, that is, it is difficult to introduce white dots to an office-use printer with a low resolution. In other words, stable tone reproduction with high screen running and high image quality is demanded for a low-resolution printer without introducing any white dots.

SUMMARY OF THE INVENTION

According to an aspect of the present invention, an information processing apparatus is provided which includes a displacement section arranged to displace dot-lattice points arranged in a predetermined region using rotation processing; a partition section arranged to partition the predetermined region into polygons each of which surrounds the displaced dot-lattice point; and a generator arranged to generate a threshold matrix used to grow a halftone dot which is surrounded by each polygon in a direction of the displacement.

According to another aspect of the present invention, an image information processing method is provided which includes displacing dot-lattice points arranged in a predetermined region using rotation processing; partitioning the predetermined region into polygons each of which surrounds the displaced dot-lattice point; and generating a threshold matrix used to grow a halftone dot which is surrounded by each polygon in a direction of the displacement.

Accordingly, the present invention is able to provide a halftone screen which is applicable to a low-resolution electrophotographic printer can be created. Also, a halftone screen which can suppress generation of moiré and can attain satisfactory tone reproduction can be created.

Furthermore, according to another aspect of the present invention, an image processing apparatus is provided including a memory arranged to store a threshold matrix generated by the above information processing apparatus; a comparator arranged to receive input image data and the threshold matrix from the memory in synchronism with synchronizing signals of the image forming apparatus to receive the threshold matrix corresponding to the image data from the memory, and to compare the image data with threshold values in cells of the threshold matrix; and a driver, arranged to drive a beam laser light source of the image forming apparatus in accordance with the comparison result.

Moreover, according to yet another aspect of the present invention, an image processing apparatus is provided which includes a memory which stores the a threshold matrix; a comparator arranged to input image data and the threshold matrix from the memory in synchronism with synchronizing signals of an image forming apparatus, and to compare the image data with threshold values in cells of the threshold matrix; and a driver arranged to drive a laser light source of the image forming apparatus in accordance with the comparison result, wherein the cells corresponding to blank regions are concentrated in portions of the threshold matrix.

Accordingly, the present invention is able to produce an image in which generation of moiré is suppressed and which satisfactory tone reproduction can be formed using a low-resolution electrophotographic printer.

Further aspects and features of the present invention will become apparent from the following description of exemplary embodiments with reference to the attached drawings.

BRIEF DESCRIPTION OF THE DRAWINGS

FIG. 17 is a view showing a threshold matrix used to blacken a certain Voronoi polygon;

FIGS. 18 to 20 are views showing blackening processes (growing of halftone dots);

FIGS. 22A and 22B are views showing threshold matrices stored in dither threshold memories;

FIG. 26 is a view showing displacement vectors of respective lattice points displaced in the sub-scan direction;

FIG. 27 is a view showing halftone dots when tone values=30%;

FIG. 28 is a view showing halftone dots when tone values=70%; and

FIG. 29 is a view for explaining an effect due to coupling of halftone dots in the sub-scan direction.

DESCRIPTION OF THE EMBODIMENTS

An information processing apparatus, image processing apparatus, information processing method and image processing method according to the exemplary embodiments of the present invention will be described in detail hereinafter with reference to the accompanying drawings.

First Exemplary Embodiment

[Example Apparatus Arrangement]

Figure 1:
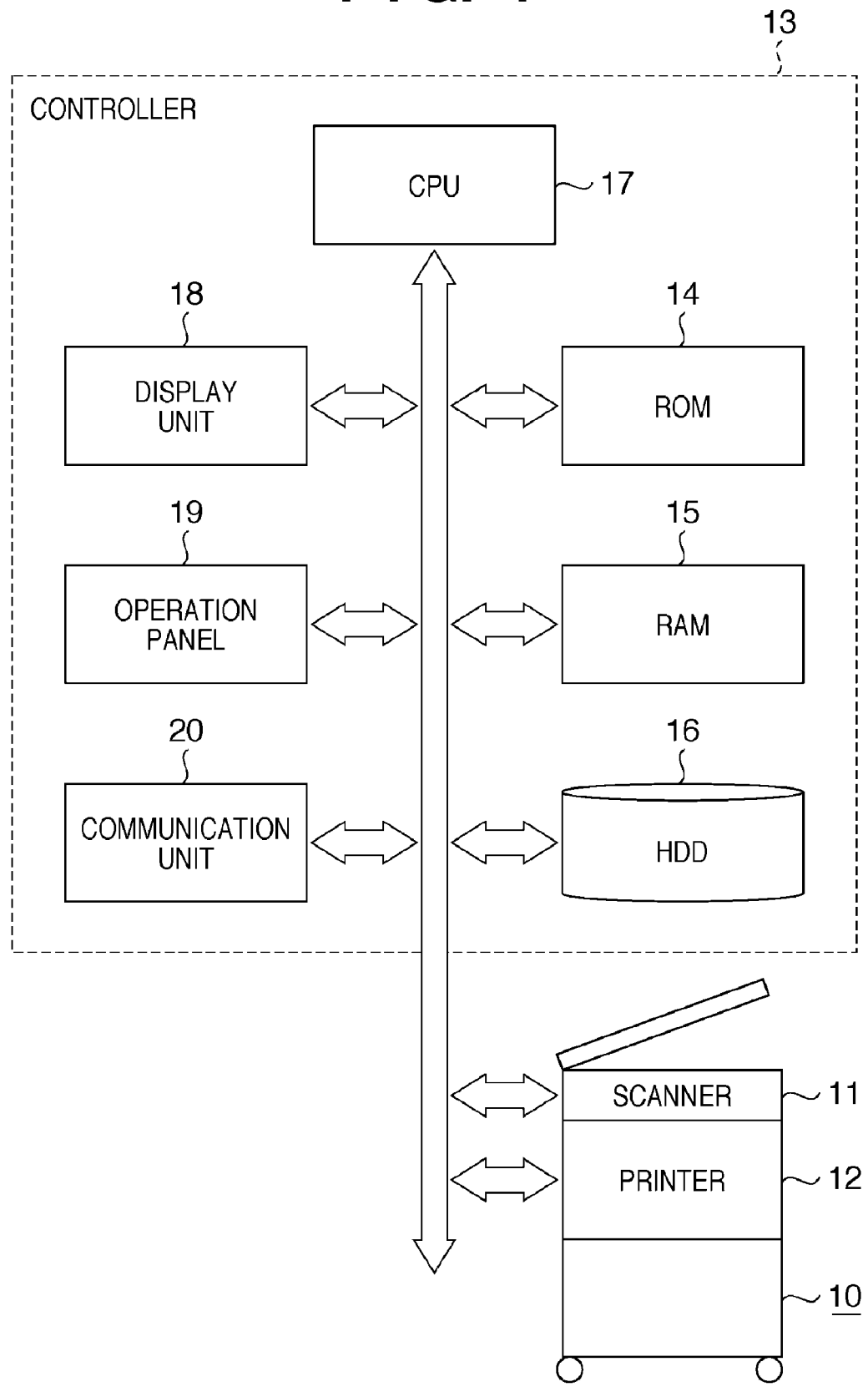
FIG. 1 is a block diagram showing the arrangement of an example image processing apparatus according to an embodiment.

FIG. 1 is a block diagram showing the arrangement of an image processing apparatus according to an embodiment.

Functions of a multi-functional peripheral equipment (MFP) 10, which has a scanner 11 and an electrophotographic printer 12, are controlled by a controller 13 incorporated in the MFP 10. For example, the controller 13 corresponds to the information processing apparatus in the embodiment.

A microcontroller (CPU) 17 of the controller 13 executes an operating system (OS) and various programs stored in a read only memory (ROM) 14 and hard disk drive (HDD) 16 using a random access memory (RAM) 15 as a work memory. The HDD 16 stores programs such as a control program, image processing program, and the like, and image data.

The CPU 17 displays a user interface on a display unit 18 and inputs user's instructions from software keys on the display unit 18 and a keyboard of an operation panel 19. For example, when a user's instruction indicates a copy instruction, the CPU 17 controls the printer 12 to print a document image scanned by the scanner 11 (copy function).

A communication unit 20 is a communication interface which is connected to a public line and computer network (although not shown). When a user's instruction indicates a facsimile sending instruction, the CPU 17 controls the communication unit 20 to send a document image scanned by the scanner 11 to a communication partner designated by the user as a facsimile image (facsimile function). When a user's instruction indicates a push scan instruction, the CPU 17 controls the communication unit 20 to send a document image scanned by the scanner 11 to a designated server (push scan function). When the communication unit 20 receives a facsimile image, the CPU 17 controls the printer 12 to print the received image (facsimile function). When the communication unit 20 receives a print job, the CPU 17 controls the printer 12 to print an image in accordance with the print job (printer function). When the communication unit 20 receives a pull scan job, the CPU 17 sends a document image scanned by the scanner 11 to a designated server or client in accordance with the scan job (pull scan function).

[Example Arrangement of Optical System]

Figure 2:
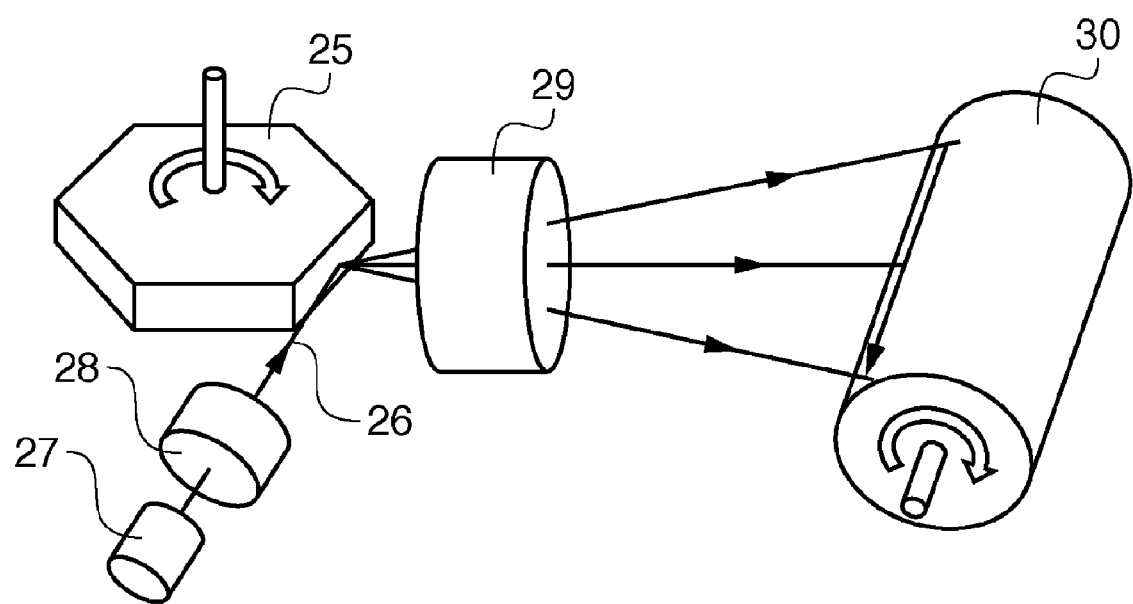
FIG. 2 is a view showing the arrangement of an optical system of a printer.

FIG. 2 is a view showing the arrangement of an optical system of the printer 12.

A light beam 26 emitted by a light source 27 such as a semiconductor laser element or the like enters a reflecting surface of a rotary polygonal mirror 25 via a collimator lens 28 based on a spherical system or anamorphic optical system. The light beam 26 deflected by rotation of the rotary polygonal mirror 25 is imaged on a rotating photosensitive drum 30 via an imaging lens 29 such as an f-θ lens or the like, thus optically scanning the surface of the photosensitive drum 30.

[Example Dot Generator]

Figure 3:
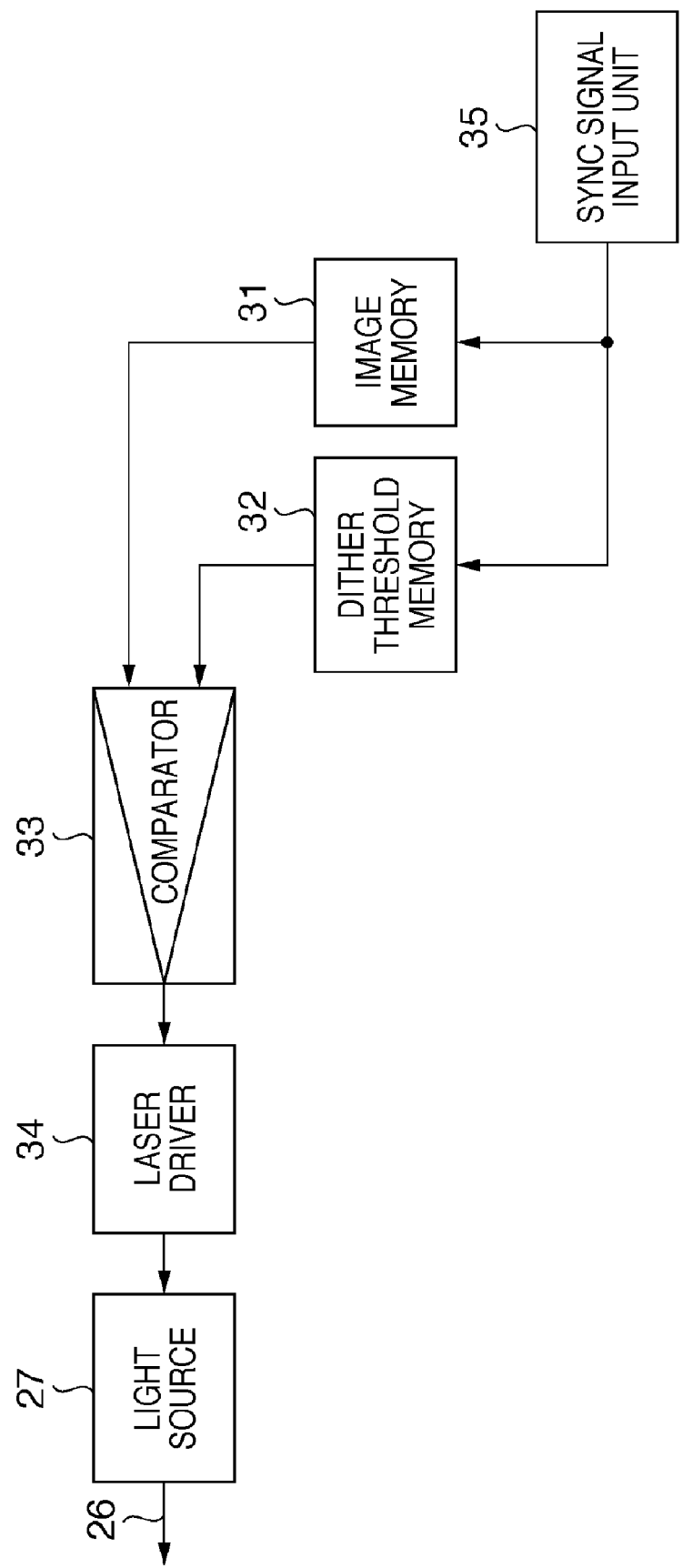
FIG. 3 is a block diagram showing the arrangement of a dot generator which generates a hybrid halftone screen (HHS)

FIG. 3 is a block diagram showing the arrangement of a dot generator which generates a hybrid halftone screen (HHS). Note that the dot generator is configured as a part of the controller 13.

A sync signal input unit 35 inputs, as synchronizing signals, a horizontal synchronizing signal Hsync indicating the scan timing of one line, vertical synchronizing signal Vsync indicating the scan timing of one page, and pixel clocks Vclock from the printer 12. These synchronizing signals are sequentially input to an image memory 31 allocated on the RAM 15, thus outputting image data corresponding to the scan position of the photosensitive drum 30. The synchronizing signals are sequentially input to a dither threshold memory 32 allocated on the ROM 14 or RAM 15, thus outputting a threshold matrix (to be described later) corresponding to the scan position of the photosensitive drum 30.

A comparator 33 receives image data and threshold matrix corresponding to the scan position of the photosensitive drum 30, and compares the image data and thresholds in respective cells of the threshold matrix, thus outputting, for each cell, a binary signal according to:

If $D \geq Th0$, output signal='1'

If $D < Th0$, output signal='0'  (1)

where Th0 is a threshold, and
D is image data.

A laser driver 34 drives the light source 27 in accordance with the binary signals output from the comparator 33, thereby controlling light emission of the light source 27. That is, when the output signal from the comparator 33 is '1', the laser driver 34 controls the light source 27 to output the light beam 26 (laser ON); when the output signal is '0', it controls the light source 27 not to output the light beam 26 (laser OFF).

[Example Creation of HHS]

Figure 4:
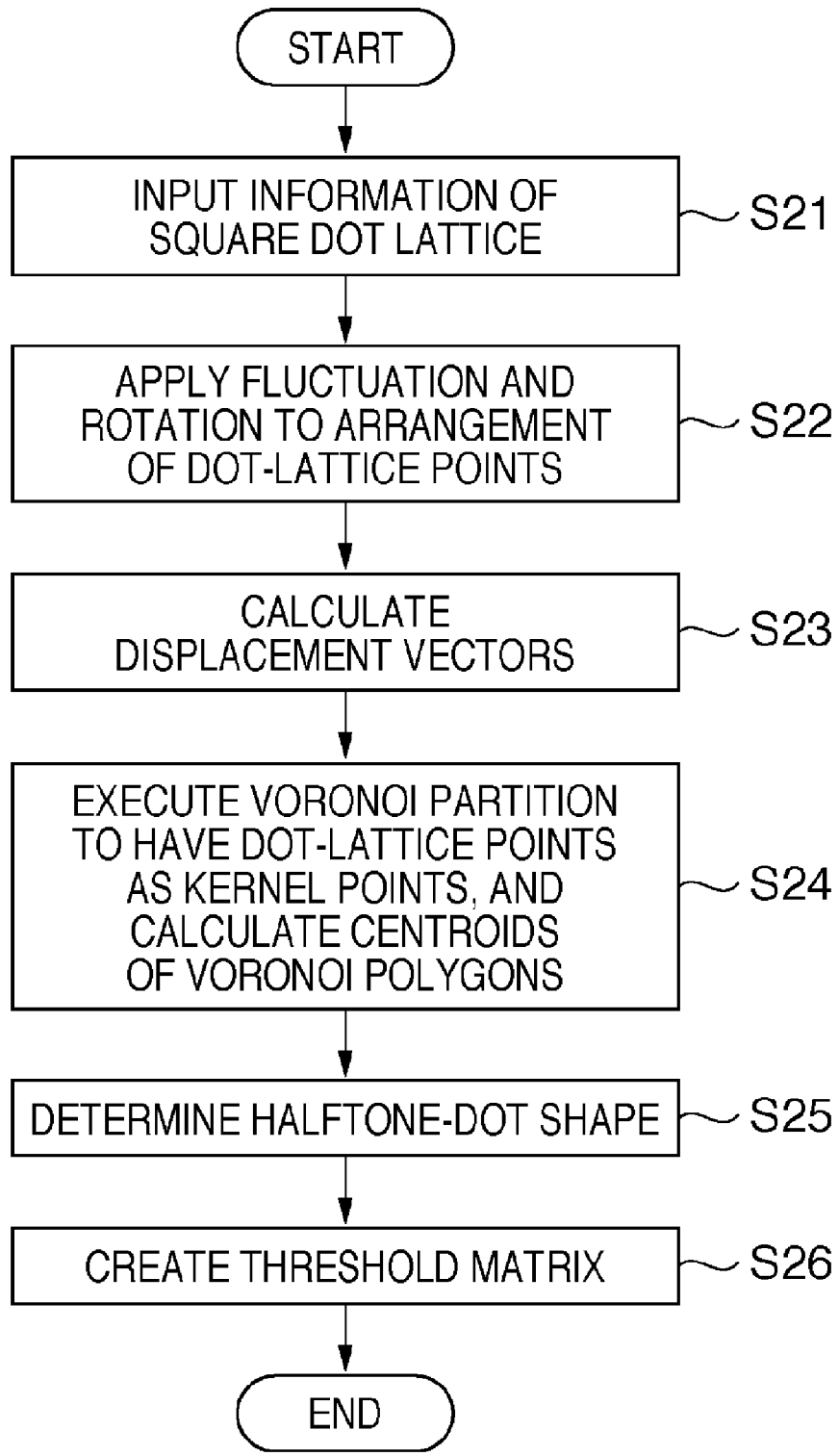
FIG. 4 is a flowchart for explaining processing for generating an HHS.

FIG. 4 is a flowchart for explaining processing for creating an HHS. The CPU 17 executes this processing.

[Example "Fluctuation" and "Rotation" Manipulations]

Figure 5:
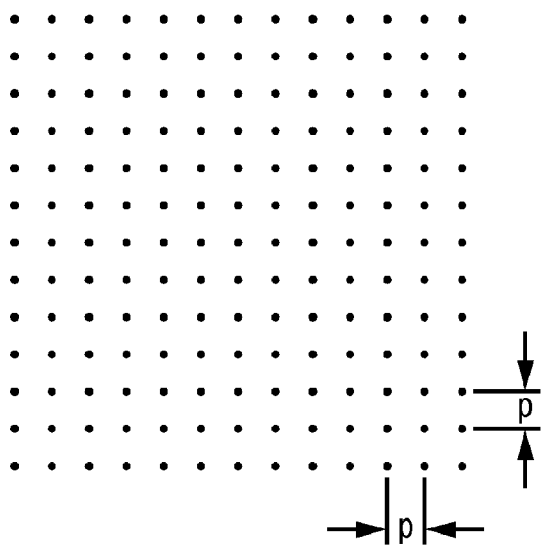
FIG. 5 is a view showing a square dot lattice.

The CPU 17 receives information of an aligned (regularly arranged) square dot lattice (lattice interval p) from the ROM 14 or HDD 16 (S21). FIG. 5 is a view showing the square dot lattice which is formed by aligning dot-lattice points at an interval p. The density of dot-lattice points, which gives an average lattice interval of an HHS is determined so that the screen ruling of an image to be formed is a target value.

Figure 6:
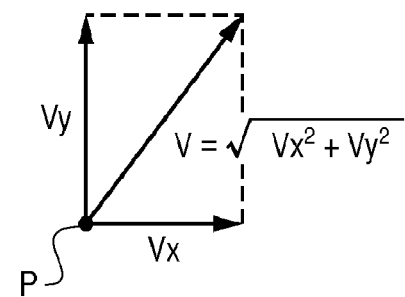
FIG. 6 is a view showing a "fluctuation" manipulation.

The CPU 17 applies "fluctuation" and "rotation" manipulations to an arrangement of dot-lattice points (S22), and calculates displacement vectors from the application result (S23). FIG. 6 is a view showing the "fluctuation" manipulation, which applies random displacements Vx and Vy to a dot-lattice point P in the x- and y-directions. A displacement vector $\vec{V1}$ is given by:

$$\vec{V1} = (Vx1, Vy1) \quad (2)$$

where Vx1 is a random displacement in the x-direction, and
Vy1 is a random displacement in the y-direction.

Figure 7:
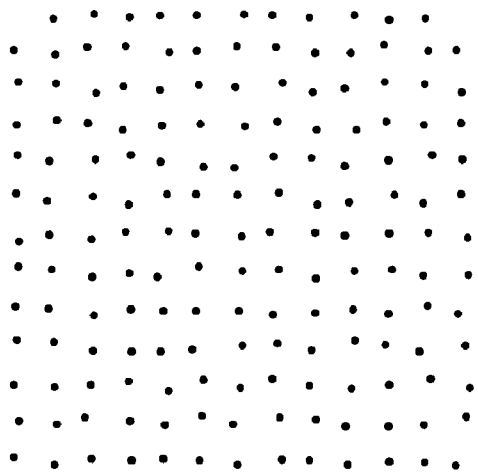
FIG. 7 is a view showing an arrangement of dot-lattice points displaced by the "fluctuation" manipulation.
Figure 8:
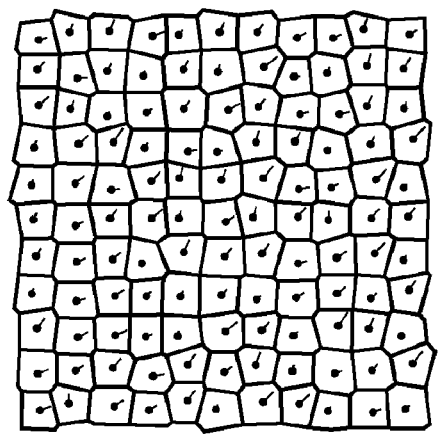
FIG. 8 is a view showing displacement vectors of respective lattice points by the "fluctuation" manipulation.

FIG. 7 is a view showing the arrangement of dot-lattice points displaced by the "fluctuation" manipulation. FIG. 8 is a view showing displacement vectors of respective dot-lattice points by the "fluctuation" manipulation, and there is no correlation between displacement vectors since random displacements are applied.

Figure 9:
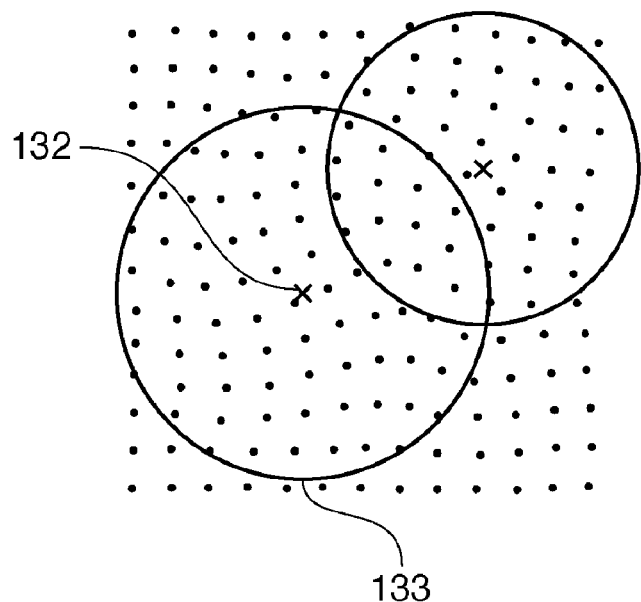
FIG. 9 is a view showing an arrangement of dot-lattice points displaced by a "rotation" manipulation to have a given point as the center of rotation.

FIG. 9 is a view showing the arrangement of dot-lattice points displaced by the "rotation" manipulation to have a point 132 as the center of rotation. The coordinates of a dot-lattice point after the "rotation" manipulation are given by:

$$Px' = (Px - Jx)\cos\theta - (Py - Jy)\sin\theta + Jx$$

$$Py' = (Px - Jx)\sin\theta + (Py - Jy)\cos\theta + Jy \quad (3)$$

where (Px, Py) are the coordinates of a dot-lattice point before rotation, (Px', Py') are the coordinates of the dot-lattice point after rotation, and (Jx, Jy) are the coordinates of the center 132 of rotation.

In equations (3), θ is a rotation angle, which decreases with increasing a distance from the center 132 of rotation, as given by:

$$\theta = \theta_0(1 - r/r_0) \qquad (4)$$

where r is the distance from the center 132 of rotation to the dot-lattice point (Px, Py), $r_0$ is a radius (denoted by reference numeral 133 in FIG. 9) of rotation, and $\theta_0$ is a rotation angle at the center 132 of rotation.

As the "rotation" manipulation, various methods may be used. In this embodiment, a simple method using equation (4) will be explained. As a result of this "rotation" manipulation, a displacement vector $\overrightarrow{V2}$ of a dot-lattice point before rotation and that after rotation is given by:

$$\overrightarrow{V2} = (Vx2, Vy2) = (Px' - Px, Py' - Py) \qquad (5)$$

Figure 10:
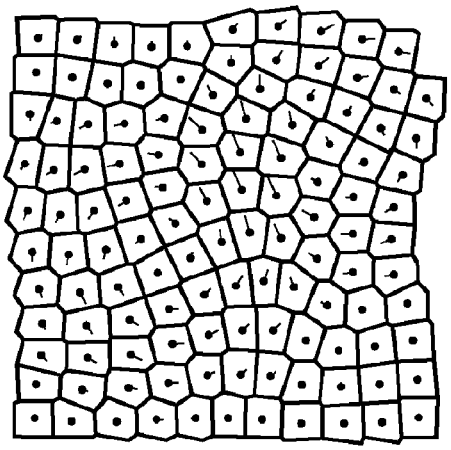
FIG. 10 is a view showing displacement vectors of respective lattice points by the "rotation" manipulation.

FIG. 10 is a view showing displacement vectors of respective dot-lattice points after the "rotation" manipulation, and there is no correlation between displacement vectors since random displacements are applied.

[Example Voronoi Partition]

Next, referring back to FIG. 4, the CPU 17 creates Voronoi polygons by executing Voronoi partition to have the displaced dot-lattice points as kernel points, and calculates centroids of respective Voronoi polygons (S24). A Voronoi polygon with respect to a dot-lattice point Pi is a set of points V(Pi) given by:

$$V(Pi) = \{P | d(P, Pi) < d(P, Pj), \forall j \neq i\} \qquad (6)$$

where Pj is a dot-lattice point adjacent to Pi, d(P, Pi) is the distance between a point P and the dot-lattice point Pi, and d(P, Pj) is the distance between the point P and dot-lattice point Pj.

The Voronoi polygon represents an influential zone of the dot-lattice point Pi.

Each side (Voronoi boundary) of the Voronoi polygon is a line segment that couples the circumcenters of Delaunay triangles. The Delaunay triangle has, as sides, line segments that couple adjacent dot-lattice points, and is uniquely determined with respect to the dot-lattice point. Therefore, the Voronoi polygon is also uniquely determined. The circumcenter (Gx, Gy) of the Delaunay triangle is expressed by:

$$Gx = \{X0^2(Y1 - Y2) + X1^2(Y2 - Y0) + X2^2(Y0 - Y1) - (Y0 - Y1)(Y1 - Y2)(Y2 - Y0)\}/L$$

$$Gy = -Gx(X2 - X1)/(Y2 - Y1) + (X2 - X1)(X1 + X2)/2/(Y2 - Y1) + (Y1 + Y2)/2 \qquad (7)$$

$$\text{for } L = 2\{X0(Y1 - Y2) + X1(Y2 - Y0) + X2(Y0 - Y1)\}$$

where (X0, Y0), (X1, Y1), and (X2, Y2) are the coordinates of vertices of the Delaunay triangle.

In this way, a Voronoi polygon including one dot-lattice point is formed, and that Voronoi polygon is used to define a halftone-dot shape. The initial square dot lattice has periodicity, but that periodicity is disturbed by the "fluctuation" and "rotation" manipulations. Therefore, generation of moiré can be suppressed.

Figure 11:
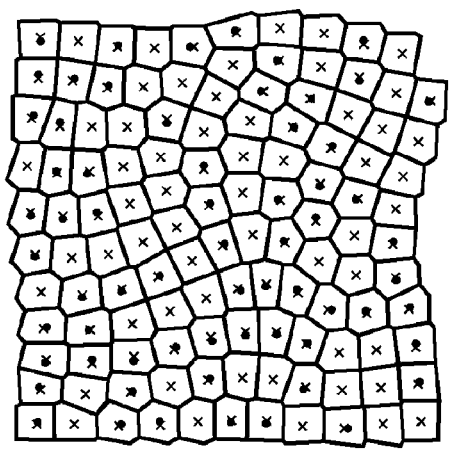
FIG. 11 is a view showing Voronoi polygons and the centroids of the Voronoi polygons.

The CPU 17 sets the centroids of the Voronoi polygons as the centers of blackening (growing of halftone dots). Note that the centroid of each Voronoi polygon is calculated by partitioning the Voronoi polygon into triangles, calculating the centroids and areas of the triangles, weighting the centroids of the triangles by the areas of the corresponding triangles, and calculating an average value of the centroids. FIG. 11 is a view showing Voronoi polygons and the centroids (× marks) of these Voronoi polygons. In general, unlike the position of a dot-lattice point, the position of centroid is set as a new center of blackening, so that an effect of relaxing over-approaching of (separating off) dot-lattice points is obtained, and this process is effective for homogeneity and uniformity.

[Example Flattening of Polygons]

Next, returning back to FIG. 4, the CPU 17 determines a blackening region (halftone-dot shape) (S25). The displacement vector $\overrightarrow{V1}$ as a result of "fluctuation" and the displacement vector $\overrightarrow{V2}$ as a result of "rotation" are synthesized to obtain a vector $\overrightarrow{V}$ given by:

$$\overrightarrow{V} = \overrightarrow{V1} + \overrightarrow{V2} = (Vx1 + Vx2, Vy1 + Vy2) \qquad (8)$$

Figure 12:
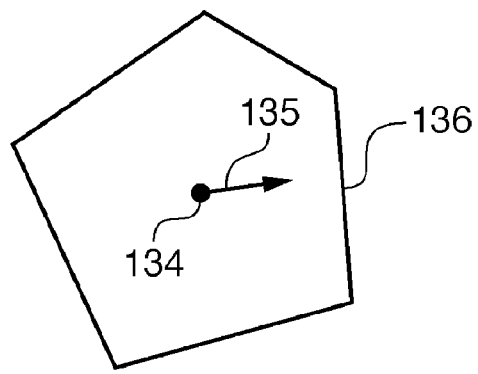
FIG. 12 is a view showing one of Voronoi polygons.
Figure 13:
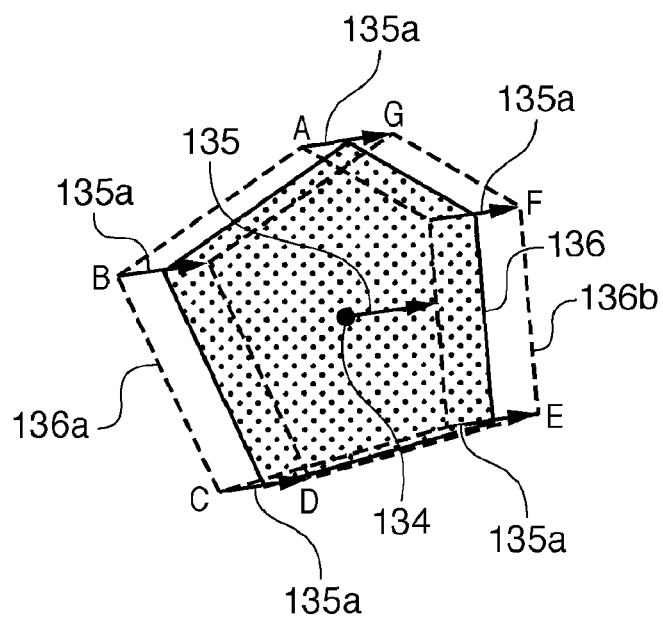
FIG. 13 is a view showing a method of determining a halftone-dot shape by flattening a Voronoi polygon along a displacement vector.

FIG. 12 is a view showing one of Voronoi polygons, and a Voronoi polygon 136 has a centroid 134 and resultant displacement vector 135. FIG. 13 is a view showing a method of determining a halftone-dot shape by flattening the Voronoi polygon 136 along the resultant displacement vector 135.

Vectors 135a are allocated at respective vertices so that the vertices of the Voronoi polygon 136 match the midpoint of the resultant displacement vector 135, and polygons 136a and 136b similar to the Voronoi polygon 136 are generated to have start and end points of the vectors 135a as vertices. That is, the polygons 136a and 136b obtained by expanding the Voronoi polygon 136 along the vectors 135a in respective directions are generated. Then, a convex hull polygon (flattened polygon) ABCDEFG indicating the halftone-dot shape is generated from vertices A, B, and C of the polygon 136a and vertices D, E, F, and G of the polygon 136b. As a result of this flattening, a polygon as an (N+2)-gon at a maximum can be generated from the Voronoi polygon as an N-gon.

[Example Blackening Process]

The blackening process (growing process of halftone dots) will be described below with reference to FIGS. 14 to 16.

Figure 14:
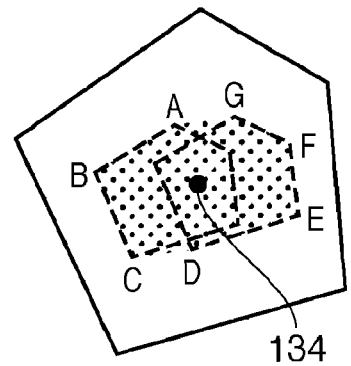
FIG. 14 is a view showing a halftone dot near highlight.

FIG. 14 is a view showing a halftone dot near highlight when tone values are small. The polygon ABCDEFG enlarges to have, as the center, the centroid 134 of the Voronoi polygon along with the growth of a halftone dot while holding a similar shape. That is, the centroid 134 of the Voronoi polygon is defined as the center of growth of the halftone dot. FIG. 18 is a view showing halftone dots when tone values=30%. Halftone dots flattened in the directions of the displacement vectors are formed to have a whorl-like pattern as a result of the "rotation" manipulation.

Figure 15:
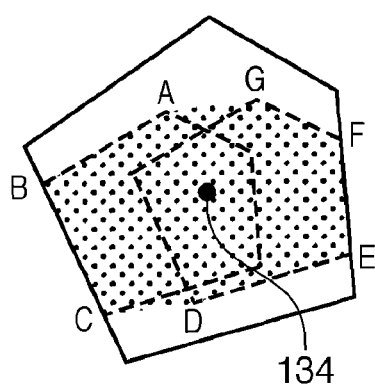
FIG. 15 is a view showing a state in which a halftone dot grows to be in contact with adjacent Voronoi polygons.

FIG. 15 is a view showing a state in which the halftone dot grows (as the tone values increase), and is in contact with adjacent Voronoi polygons. When the tone values increase, sides BC and EF in directions along the displacement vector of the polygon ABCDEFG are brought into contact with the sides of the adjacent Voronoi polygons. The sides BC and EF are parallel to the corresponding sides of the Voronoi polygon before flattening, and are brought into contact with the adjacent Voronoi polygons not by points but by sides. When the state shown in FIG. 15 is reached, the growth of the halftone dot along the direction of the displacement vector stops.

Figure 16:
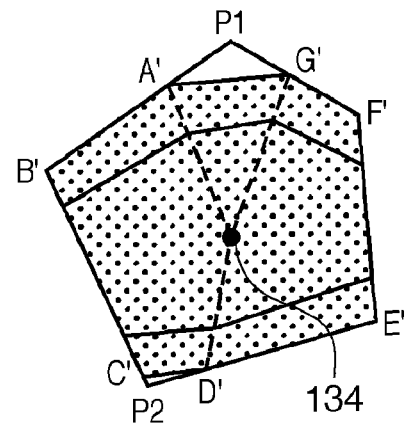
FIG. 16 is a view showing a state in which a halftone dot further grows.

FIG. 16 is a view showing a state in which the halftone dot further grows. In FIG. 16, the halftone dot grows in a direction perpendicular to the direction of the displacement vector, and sides AB and DE are brought into contact with the sides of the adjacent Voronoi polygons. ΔP1A'G' and ΔP2C'D' remain as blank regions in this state, and blank regions are concentrated to portions in the Voronoi polygon before flattening.

Figure 19:
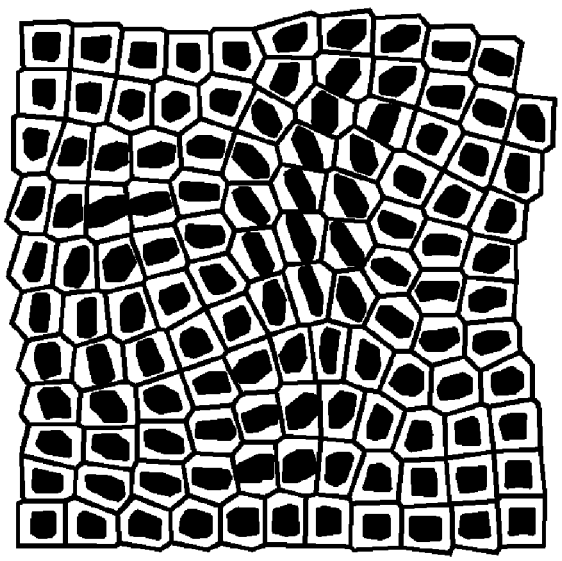
Figure 20:
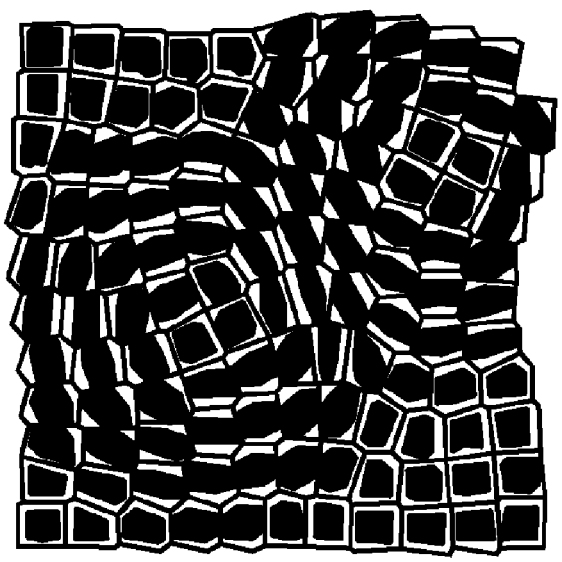

FIGS. 18 to 20 are views showing the blackening processes (growing of halftone dots), that is, a state in which halftone dots grow along the directions of the displacement vectors.
[Example Creation of Threshold Matrix]

Next, returning back to FIG. 4, The CPU 17 then creates a threshold matrix (S26). FIG. 17 is a view showing a threshold matrix used to blacken a certain Voronoi polygon (to grow a halftone dot).

A threshold matrix is prepared by partitioning the interior of a Voronoi polygon in accordance with the dot size of the printer 12, and setting, in cells, thresholds which are used when a dot of the printer 12 is switched from OFF to ON, and correspond to pixel values. When a Voronoi polygon includes many pixels (cells), the halftone-dot shape during the growth process is nearly similar to the aforementioned flattened polygon. However, when a low-resolution printer is used to form an HHS with the high screen ruling, the number of pixels (cells) included in one Voronoi polygon is very small, and the halftone-dot shape during the growth process is not similar to the flattened polygon but it is modified slightly. However, the concentration effect of the white dot area remains unchanged.

Of course, the CPU 17 does not create a threshold matrix of a Voronoi polygon corresponding to one dot-lattice point, but creates threshold matrices of Voronoi polygons for the entire HHS. These threshold matrices are stored in, for example, the HDD 16 in association with the positions of dot-lattice points before displacement.
[Example Increase in Number of Tones]

With the example of the threshold matrix shown in FIG. 17, only 61 tones are expressed since the number of pixels is 60. Hence, the number of tones can be increased by adding pulse width modulation of the light beam by the laser driver 34.

Figure 21:
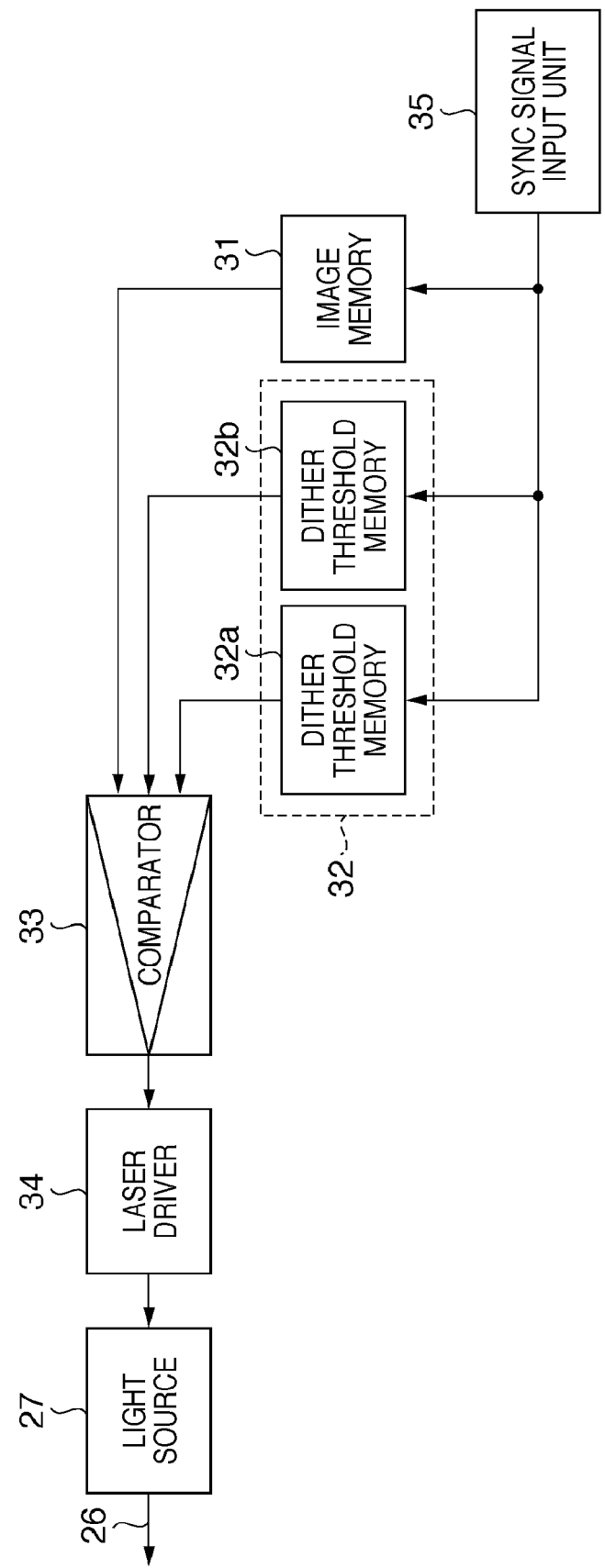
FIG. 21 is a block diagram showing an example of the arrangement of a dot generator used upon increasing the number of tones of a print image.

FIG. 21 is a block diagram showing the arrangement of a dot generator upon increasing the number of tones of a print image. As a difference from the arrangement shown in FIG. 3, this dot generator includes two dither threshold memories 32a and 32b. FIGS. 22A and 22B are views showing threshold matrices stored in the dither threshold memories 32a and 32b, and thresholds are alternately set so that FIG. 22A indicates odd thresholds, and FIG. 22B indicates even thresholds. That is, the dither threshold memory 32a stores the threshold matrix shown in FIG. 22A, and the dither threshold memory 32b stores the threshold matrix shown in FIG. 22B in association with a certain Voronoi polygon.

The comparator 33 receives image data and two threshold matrices corresponding to the scan position of the photosensitive drum 30, and compares the image data and thresholds in cells, thus outputting, for each cell, a ternary signal according to:

If Th0≦D, output signal='2'

If Th1≦D<Th0, output signal='1'

If D<Th1, output signal='0'  (9)

where Th0 is a threshold of the threshold matrix shown in FIG. 22B,
Th1 is a threshold of the threshold matrix shown in FIG. 22A, and
D is image data.

In the example shown in FIGS. 22A and 22B, input data needs to be normalized by 120. That is, if image data is defined by 8 bits, the comparator 33 calculates image data× 120/255, and executes the above comparison using the normalized image data. In the example shown in FIGS. 22A and 22B, the normalized image data needs to have one significant digit after the decimal point.

Figure 23A:
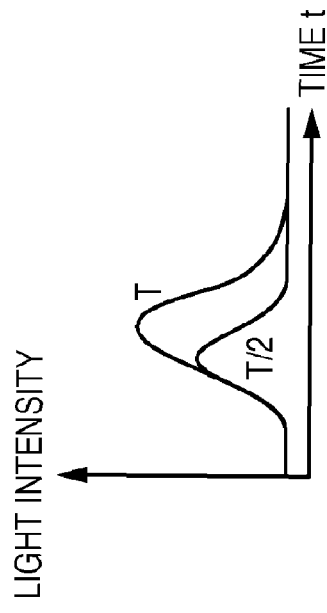
FIGS. 23A to 23D are graphs for explaining emission control of a light source.

The laser driver 34 controls light emission of the light source 27 in accordance with the ternary signals output from the comparator 33. That is, as shown in FIG. 23A, when the output signal from the comparator 33 is '2', the laser driver 34 controls the light source 27 to output the light beam 26 with a pulse width T. When the output signal is '1', the laser driver 34 controls the light source 27 to output the light beam 26 with a pulse width T/2, and when the output signal is '0', it controls the light source 27 not to output the light beam 26. In this way, the number of tones can be increased by pulse width modulation, and when a threshold matrix including the number of pixels=60 is used, 121 tones can be obtained.

Figure 23B:
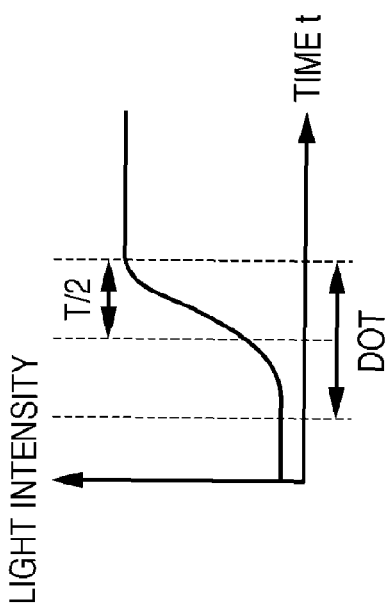

However, as shown in FIG. 23B, a peak value of the light intensity of the pulse width T/2 is lower than that of the light intensity of the pulse width T, and exposure by the pulse width T/2 is very unstable. To solve this problem, the laser driver 34 controls the emission timing of the light source 27, so that a dot to be formed with the pulse width T/2 (to be referred to as a half dot hereinafter) neighbors that formed or to be formed with the pulse width T (to be referred to as a full dot hereinafter).

Figure 23C:
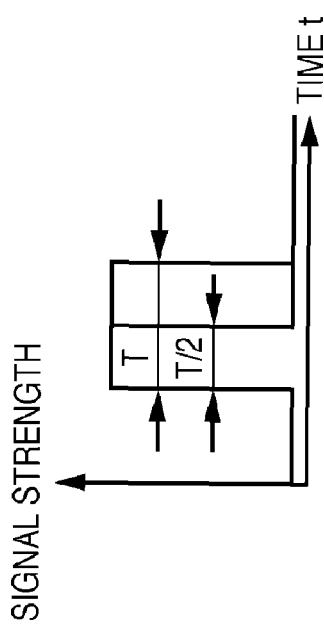
Figure 23D:
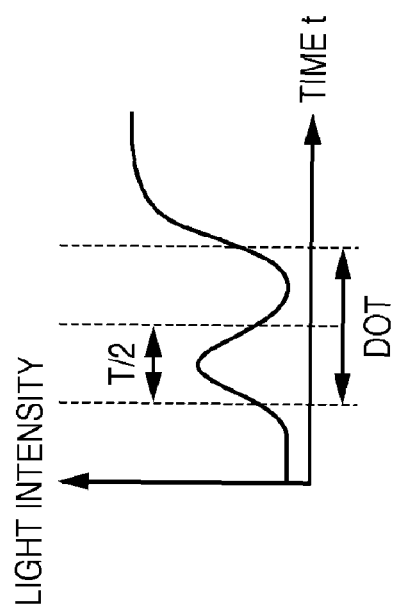

For example, FIG. 23C shows an example in which the emission timing of the light source 27 is controlled to form a half dot on the left side of a dot width and then to form a full dot. In this example, since a half dot isolated from a full dot is formed on the left side of the dot width, that half dot is very unstable. On the other hand, FIG. 23D shows an example in which the emission timing of the light source 27 is controlled to form a half dot on the right side of a dot width and then to form a full dot. Since the half dot is formed adjacent to the full dot, the half dot can be stably formed.

In the above description, the controller 13 of the MFP 10 generates the HHS. However, an HHS with an average lattice interval according to the screen ruling of an image to be formed may be created in advance and may be stored in the HDD 16 or the like. Then, an HHS required for image formation may be loaded onto the dither threshold memory 32.

As described above, a hybrid halftone screen (HHS) which is also applicable to an electrophotographic office printer can be generated. When a print image is formed using this HHS, the tonality in a high-density region (shadow region) can be stabilized due to clustering of blank regions. Therefore, in the electrophotographic office printer, stable tone reproduction with high screen ruling and high image quality in which moiré is suppressed can be achieved without introducing any white dots.

Second Exemplary Embodiment

Image processing of the second embodiment according to the present invention will be described hereinafter. Note that the same reference numerals in the second embodiment denote the same parts as those in the first embodiment, and a detailed description thereof will not be repeated.

Figure 24:
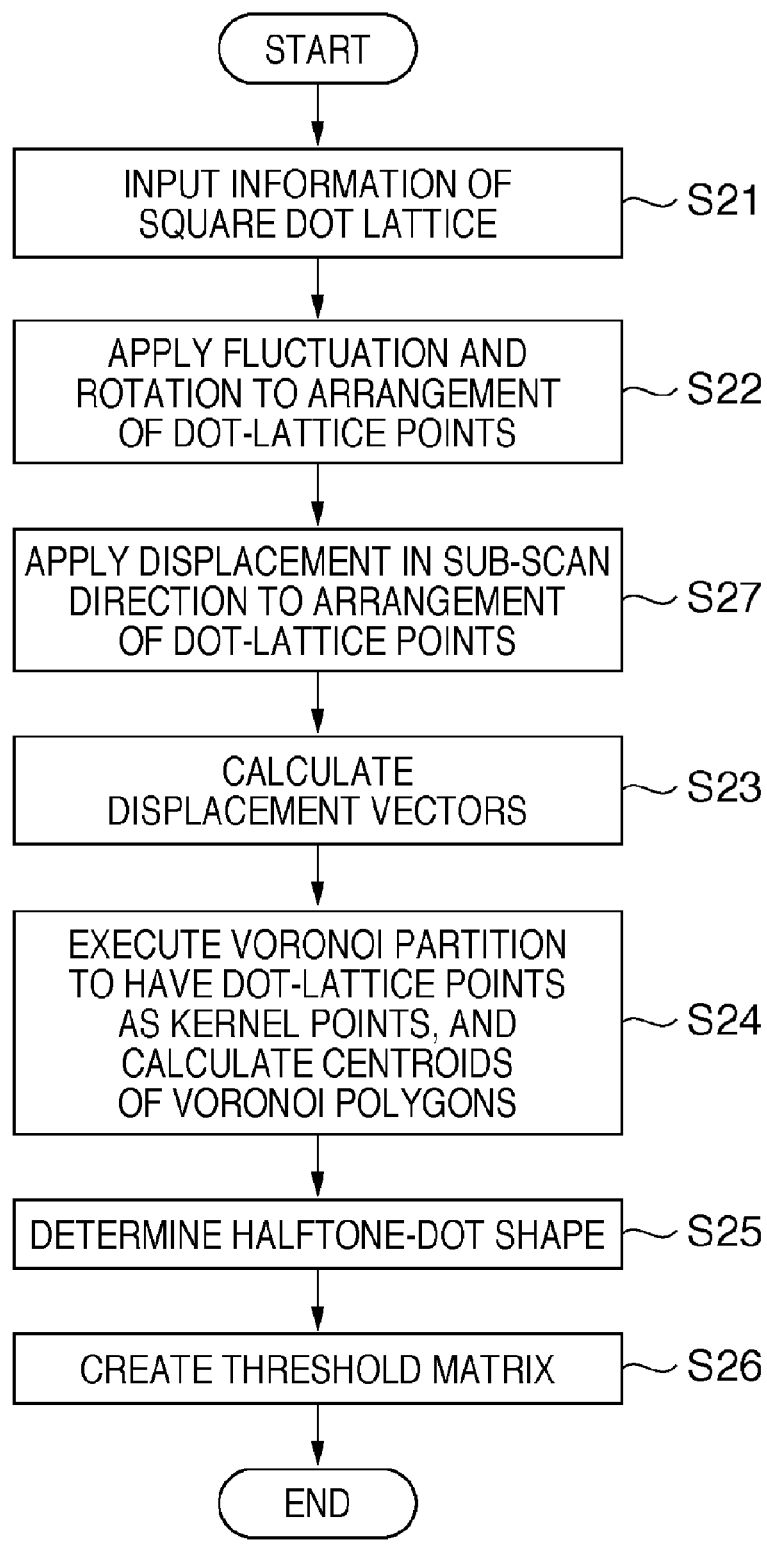
FIG. 24 is a flowchart for explaining processing for generating an HHS according to the second embodiment.

FIG. 24 is a flowchart for explaining processing for generating an HHS according to the second embodiment. The CPU 17 executes this processing. The flowchart shown in FIG. 24 is the same or similar to the process shown in FIG. 4, except unlike in the processing shown in FIG. 4, a displacement in the sub-scan direction is applied to the arrangement of dot-lattice points (S27).

Figure 25A:
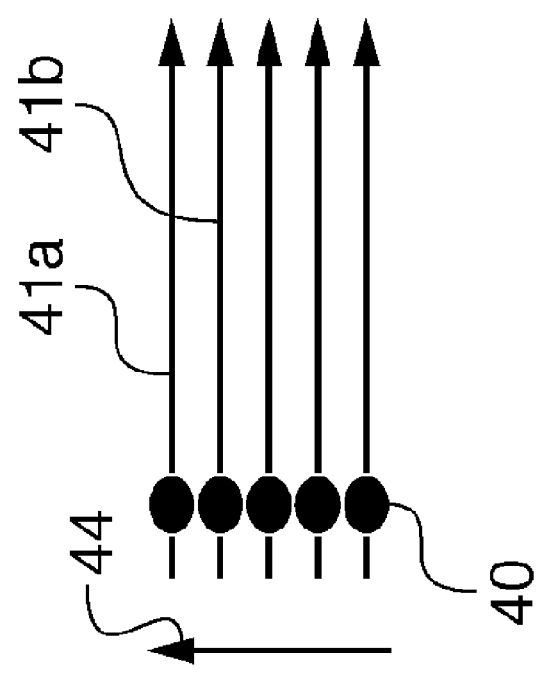
FIGS. 25A and 25B are views for explaining generation of banding noise.
Figure 25B:
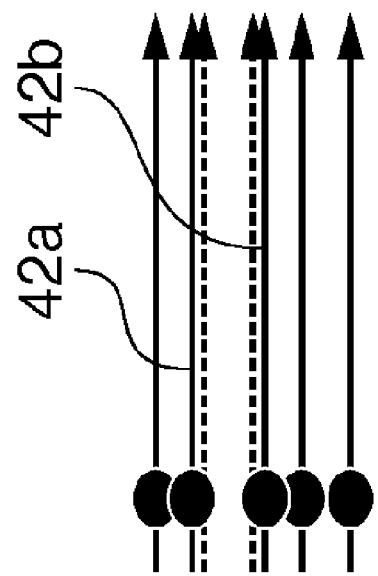

As described above, an electrophotographic printing apparatus is readily influenced by heterogeneity in pitch and banding noise. As shown in FIG. 25A, a laser spot 40 is scanned on the surface of the photosensitive drum 30 in the main scan direction, and scan lines 41*a* and 41*b* have a regular interval in a sub-scan direction 44. However, due to a tilt of the reflecting surface of the rotary polygonal mirror 25, heterogeneity in rotation of the photosensitive drum 30, and the like, scan lines 42*a* and 42*b* with an irregular interval are formed, as indicated by broken lines in FIG. 25B. When the interval between the scan lines becomes irregular, a band-shaped stripe pattern (so-called banding noise) appears on a print image, thus considerably deteriorating image quality.

In order to eliminate image quality deterioration due to the irregular interval between the scan lines, a displacement in the sub-scan direction is applied to the arrangement of dot-lattice points. A displacement vector $\vec{V3}$ in the sub-scan direction 44 is expressed by:

$$\vec{V3} = (Vx3, Vy3) = (Vx3, 0) \quad (10)$$

Note that when the y-direction is defined as the sub-scan direction, the displacement vector $\vec{V3}$ has only an x-component.

A displacement vector $\vec{V}$ obtained by synthesizing the displacement vector $\vec{V3}$ to the aforementioned displacement vectors $\vec{V1}$ and $\vec{V2}$ is given by:

$$\vec{V} = \vec{V1} + \vec{V2} + \alpha \cdot \vec{V3} = (Vx1 + Vx2 + \alpha \cdot Vx3, Vy1 + Vy2) \quad (11)$$

where the coefficient α represents the magnitude of the displacement vector in the sub-scan direction.

By adjusting the magnitude of the coefficient α in equation (11), the coupling strength of halftone dots in the sub-scan direction can be controlled.

FIG. 26 is a view showing displacement vectors of dot-lattice points displaced in the sub-scan direction. Compared to the displacement vectors shown in FIG. 10, vector components in the sub-scan direction (in the vertical direction in FIG. 26) increase. FIG. 27 is a view showing halftone dots when tone values=30%. Compared to halftone dots shown in FIG. 18, the halftone dots are flattened in the sub-scan direction. FIG. 28 is a view showing halftone dots when tone values=70%. As can be seen from FIG. 28, the halftone dots are coupled in the sub-scan direction in whole, although depending on the setting of the aforementioned coefficient α.

FIG. 29 is a view for explaining an effect due to coupling of halftone dots in the sub-scan direction.

Normally, the laser spot 40 has an elliptic shape having the sub-scan direction 44 as a major axis. Even when the scan lines 42*a* and 42*b* suffer heterogeneity in pitch, since a line contiguous in the sub-scan direction 44 is formed by overlapping the positions of the laser spot 40, it is hardly influenced by heterogeneity in pitch. On the other hand, a line contiguous in the main scan direction can hardly receive an overlapping effect of the laser spot 40, and banding noise cannot be eliminated. For example, using a printer which suffers heterogeneity in pitch, vertical lines (those along the sub-scan direction) and horizontal lines (those along the main scan direction), each of which has a one-pixel width, are drawn at equal intervals, that is, every third pixel. In this case, the vertical lines do not receive any influence of heterogeneity in pitch. However, the horizontal lines receive the influence of heterogeneity in pitch, and the interval between the horizontal lines changes to cause heterogeneity in density, thus generating banding noise.

When the displacement in the sub-scan direction is applied to dot-lattice points as in the second embodiment, many line components coupled in the sub-scan direction are included, and the influence of heterogeneity in pitch can be eliminated, thus expecting a stable output with high image quality.

Other Exemplary Embodiments

The present invention can be applied to a system constituted by a plurality of devices (e.g., host computer, interface, reader, printer) or to an apparatus comprising a single device (e.g., copying machine, facsimile machine).

Further, the present invention can provide a storage medium storing program code for performing the above-described processes to a computer system or apparatus (e.g., a personal computer), reading the program code, by a CPU or MPU of the computer system or apparatus, from the storage medium, then executing the program.

In this case, the program code read from the storage medium realizes the functions according to the embodiments.

Further, the storage medium, such as a floppy disk, a hard disk, an optical disk, a magneto-optical disk, CD-ROM, CD-R, a magnetic tape, a non-volatile type memory card, and ROM can be used for providing the program code.

Furthermore, besides above-described functions according to the above embodiments can be realized by executing the program code that is read by a computer, the present invention includes a case where an OS (operating system) or the like working on the computer performs a part or entire processes in accordance with designations of the program code and realizes functions according to the above embodiments.

Furthermore, the present invention also includes a case where, after the program code read from the storage medium is written in a function expansion card which is inserted into the computer or in a memory provided in a function expansion unit which is connected to the computer, CPU or the like contained in the function expansion card or unit performs a part or entire process in accordance with designations of the program code and realizes functions of the above embodiments.

In a case where the present invention is applied to the aforementioned storage medium, the storage medium stores program code corresponding to the flowcharts described in the embodiments.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-269529, filed Oct. 16, 2007, which is hereby incorporated by reference herein in its entirety.

What is claimed is:

1. An information processing apparatus comprising:
   a displacement section arranged to displace dot-lattice points arranged in a predetermined region using rotation processing;
   a partition section arranged to partition the predetermined region into polygons each of which surrounds the displaced dot-lattice point; and
   a generator arranged to generate a threshold matrix used to grow a halftone dot, which is surrounded by each polygon, in a direction of the displacement.

2. The apparatus according to claim 1, wherein the generator generates a threshold matrix used to grow the halftone dot in a direction of a vector indicating the displacement until the halftone dot is in contact with adjacent polygons, and to then grow the halftone dot in only a direction perpendicular to the vector.

3. The apparatus according to claim 1, wherein the displacement section displaces the dot-lattice points by applying fluctuation and rotation to the dot-lattice points.

4. The apparatus according to claim 1, wherein the displacement section applies a displacement in a sub-scan direction to the dot-lattice points.

5. The apparatus according to claim 1, wherein the generator generates the threshold matrix having cells as many as the number of partitions of the polygon according to a dot size of an image forming apparatus, and sets thresholds to be compared with image data in the cells.

6. The apparatus according to claim 1, wherein the generator generates the threshold matrices equal in number of polygons partitioned by the partition section, and stores the threshold matrices in a memory in association with positions of the dot-lattice points before displacement.

7. The apparatus according to claim 1, wherein the dot-lattice points before displacement have an interval according to a screen ruling of an image to be formed.

8. The apparatus according to claim 1, wherein the displacement section applies a plurality of the rotation processing to the dot-lattice points to displace the dot-lattice points.

9. The apparatus according to claim 1, wherein the rotation processing rotates at least one of the dot-lattice points.

10. The apparatus according to claim 1, wherein the generator generates the threshold matrix for growing the halftone dot in a shape nearly similar to a shape of the polygon surrounding that.

11. An image processing apparatus comprising:
a memory, arranged to store a threshold matrix generated by an information processing apparatus which includes,
a displacement section arranged to displace dot-lattice points arranged in a predetermined region using rotation processing;
a partition section arranged to partition the predetermined region into polygons each of which surrounds the displaced dot-lattice point; and
a generator arranged to generate a threshold matrix used to grow a halftone dot, the generator surrounded by each polygon, in a direction of the displacement;
a comparator arranged to input image data and the threshold matrix from the memory in synchronism with synchronizing signals of the image forming apparatus, and to compare the image data with threshold values in cells of the threshold matrix; and
a driver arranged to drive a laser light source of the image forming apparatus in accordance with the comparison result.

12. An image processing apparatus comprising:
a memory configured to store a threshold matrix;
a comparator arranged to input image data and the threshold matrix from the memory in synchronism with synchronizing signals of an image forming apparatus, and to compare the image data with threshold values in cells of the threshold matrix; and
a driver arranged to drive a laser light source of the image forming apparatus in accordance with the comparison result,
wherein the threshold values in cells are arranged to concentrate blank regions in portions of an area corresponding to the threshold matrix.

13. An information processing method, comprising:
displacing dot-lattice points arranged in a predetermined region using rotation processing;
partitioning the predetermined region into polygons each of which surrounds the displaced dot-lattice point; and
generating a threshold matrix used to grow a halftone dot, which is surrounded by each polygon, in a direction of the displacement.

14. A non-transitory computer-readable medium storing a computer-executable program for causing a computer to perform an information processing method, the method comprising:
displacing dot-lattice points arranged in a predetermined region using rotation processing;
partitioning the predetermined region into polygons each of which surrounds the displaced dot-lattice point; and
generating a threshold matrix used to grow a halftone dot which is surrounded by each polygon in a direction of the displacement.

* * * * *